E. N. MILLER.
SEALING DEVICE FOR WELLS.
APPLICATION FILED APR. 30, 1921.
1,411,057.
Patented Mar. 28, 1922.
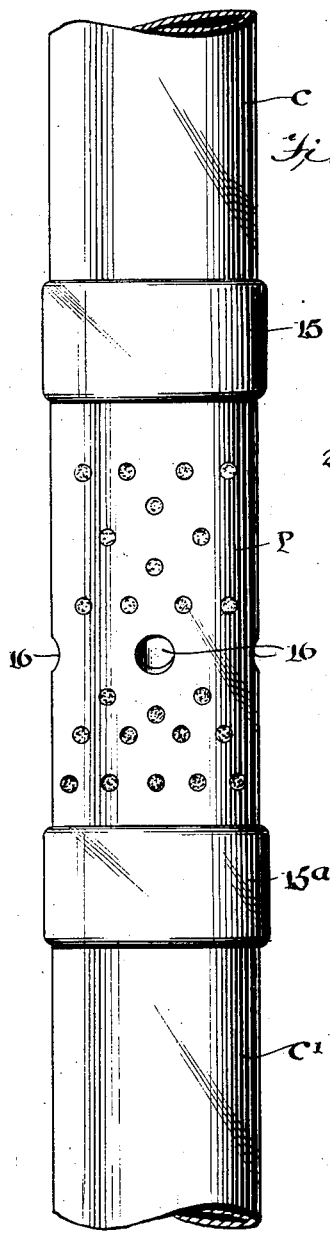
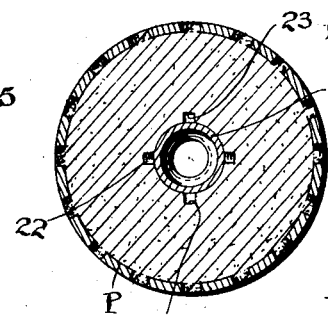
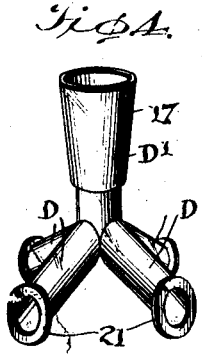
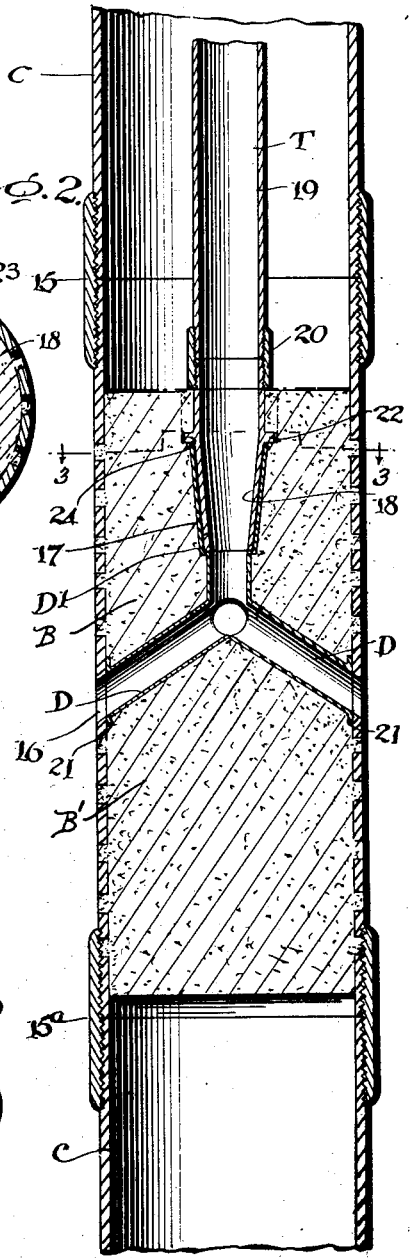
WITNESSES
INVENTOR
E. N. Miller,
BY
ATTORNEYS

UNITED STATES PATENT OFFICE.

ELIAS NEWTON MILLER, OF LARAMIE, WYOMING.

SEALING DEVICE FOR WELLS.

1,411,057.   Specification of Letters Patent.   Patented Mar. 28, 1922.

Application filed April 30, 1921. Serial No. 465,818.

*To all whom it may concern:*

Be it known that I, ELIAS NEWTON MILLER, a citizen of the United States, and a resident of Laramie, in the county of Albany and State of Wyoming, have invented certain new and useful Improvements in Sealing Devices for Wells, of which the following is a specification.

My invention relates to devices for sealing a water, gas or oil well between the wall of the well and the well casing, and the purpose of my invention is the provision of a device of that character which permanently seals in a simple and efficient manner the well to prevent the escape of water, oil or gas therefrom during the drilling operation.

In carrying out my invention, I provide a perforated section of pipe which is interposed between any two sections of the well casing, and extending into this perforated pipe is a cement conveying tube which is connected to a source of cement supply at the top of the well for conveying the cement to a plurality of distributing pipes arranged within the perforated pipe for uniformly distributing the cement to a point exteriorly of the casing so that when set the cement forms a seal between the casing and wall of the well to prevent the upward passage of water, oil or gas. Within the perforated pipe are arranged cement blocks which are in embracing position with respect to the distributing pipes so that the latter are securely held in proper position with relation to certain openings in the perforated pipe through which the cement exits to a point exteriorly of the well casing. The conveying tube is detachably associated with the distributing pipes to permit of the removal thereof and to thus allow the introduction of drilling tools into the well casing for drilling the cement blocks so that the drilling operation of the well can be continued and without danger of foreign matter passing upwardly of the well.

I will describe one form of sealing device embodying my invention, and will then point out the novel features thereof in claims.

In the accompanying drawings:

Figure 1 is a view showing a portion of a well casing having applied thereto one form of sealing device embodying my invention.

Figure 2 is a vertical sectional view of Figure 1.

Figure 3 is a transverse sectional view taken on the line 3—3 of Figure 2.

Figure 4 is a detailed perspective view of the distributing pipes shown in Figure 2.

Similar reference characters refer to similar parts in each of the several views.

Referring specifically to the drawing, C and C' designate two sections of pipe constituting a portion of a conventional form of well casing, with the confronting ends of these sections exteriorly threaded to receive coupling sleeves 15 and 15$^a$, respectively. The sealing device is arranged between the sections C and C' in the manner shown in Figure 2, and in its present embodiment the sealing device comprises a perforated pipe P exteriorly threaded at its opposite ends to engage the coupling sleeves 15 and 15$^a$ for securing the pipe in connecting relation with respect to the sections C and C'. The pipe P is provided at a point intermediate its ends with four openings 16 which communicate at the outer and lower ends of four distributing pipes D that are inclined upwardly to a common point where they are connected to a master distributing pipe D'. The pipe D' includes an inverted conical portion 17 which is adapted to removably receive a similarly shaped pipe section 18 which constitutes a portion of a conveying tube T. The conveying tube T also includes a section 19 connected to the section 18 by a coupling sleeve 20 and of such a length that its upper end is disposed at a point above the upper end of the well casing to permit of its connection with a force pump (not shown) by means of which cement or other plastic material is delivered to the tube.

As shown in Figure 4, the lower ends of the distributing pipes D are preferably flanged as indicated at 21 to provide a substantial support for the tubes with the flanges engaging the inner wall of the pipe P in the manner shown in Figure 2. The pipe section 18 is formed with keys or lugs 22 that are adapted to work in slots for detachably securing the conveying tube as a unit to the master distributing pipe D'.

As illustrated to advantage in Figure 2, the pipe P contains cement blocks B and B' arranged above and below the distributing pipes D with portions thereof extending into the perforations of the pipe P. The upper block B is formed axially thereof with an opening to receive the master distributing pipe D' and the pipe section 18 and conveying tube T. The wall of this opening is formed at its upper end with vertically extending slots 23 that communicate at the lower ends with an annular groove 24. In the application of the pipe section 18 to the master distributing pipe D', the keys 22 are passed downwardly through the slots 23, and when the pipe section is properly fitted within the pipe D', the keys 22 repose within the groove 24. Thus when the pipe section 18 is rotated to move the keys out of registration with the slots 23, the pipe section will be effectively locked within the pipe D'.

In practice, the cement blocks B and B' are applied to the perforated pipe P before the latter is associated with the well casing, and during this operation the distributing pipes D and D' are also applied thus providing a unit which is readily applicable to the two sections C and C' of the well casing by means of the coupling sleeves 15 and 15ª. Subsequent to the application of this unit to the well casing, the latter is introduced into the well whereupon the conveying tube can be extended downwardly of the well casing and the pipe section inserted in to the master distributing pipe D'. By turning the conveying tube, the locking of the tube to the master distributing pipe is effected in the manner previously described. Cement is now introduced into the conveying tube from the top of the wall, and under the action of the force pump this cement is forced downwardly of the conveying tube through the master distributing pipe and into the distributing pipes D from whence it finds exit to various points about the outer periphery of the perforated pipe P. This operation is continued until the required amount of cement has been applied to a point between the pipe P and the wall of the well to form a wall to effectively seal the space between the well casing and the well. The conveying tube T can now be removed to permit the introduction of the drilling tools, and after sufficient time has elapsed to permit of the setting of the blocks B and B' and the cement exteriorly of the pipe P, the operator may drill out the cement blocks so as to permit of the continuation of the drilling operation in the well and without the danger of the passage of water, oil or gas upwardly and exteriorly of the well casing.

Although I have herein shown and described only one form of sealing device embodying my invention, it is to be understood that various changes and modifications may be made herein without departing from the spirit of the invention or the spirit and scope of the appended claims.

What I claim is:

1. A sealing device for wells comprising a perforated pipe adapted to be interposed between the sections of a well casing, distributing pipes arranged within said pipe, plastic blocks within the pipe and in embracing relation with respect to the distributing pipes, and a conveying tube detachably connected to said distributing pipes.

2. A sealing device for wells comprising a pipe adapted to be interposed between the pipe sections of a well casing and having openings formed therein, distributing pipes within said pipe and communicating with said openings, and a conveying tube detachably connected to the distributing pipes for conveying plastic material to and through the latter to a point exteriorly of said pipe.

3. A sealing device for wells comprising a perforated pipe adapted to be interposed between the pipe sections of a well casing, said pipe being formed with openings, a plurality of distributing pipes arranged within said pipe and communicating with said openings, a master distributing pipe communicating with all of the distributing pipes, a conveying tube detachably associated with the master distributing pipe, and plastic blocks arranged within the pipe and in embracing relation to all of the distributing pipes.

4. A sealing device for wells comprising a perforated pipe having openings therein, a plurality of distributing pipes arranged within said pipe and communicating with said openings, a master distributing pipe communicating with all of the distributing pipes, a conveying tube removably fitted within the master distributing tube, keys formed on the conveying tube, and cement blocks within the perforated pipe and in embracing relation to said distributing pipes, one of said blocks being formed with slots and a groove for receiving said keys to effect the locking of the conveying tube within the block.

5. A sealing device for wells comprising a perforated pipe section adapted to be interposed between the sections of a well casing, a filling in said pipe provided with distributing passages communicating with the pipe perforations, and having a cement-conveying passage communicating with said distributing passages.

6. A sealing device for wells comprising a pipe section adapted to be interposed between the sections of a well casing, said pipe having a horizontal row of lateral perforations, a filling block within said pipe provided with inclined radial distributing passages communicating with said row of perforations of the pipe, and having an axial cement-conveying passage communicating with said distributing passages.

7. A sealing device for wells comprising a member adapted to be interposed between the sections of a well casing, said member having an axial cement-conveying passage in its upper portion and lateral distributing branch passages radiating from said axial conveying passage, and extending through the sides of the member in a horizontal row.

ELIAS NEWTON MILLER.